W. A. CROWDUS.
STORAGE BATTERY.
APPLICATION FILED MAR. 7, 1914.

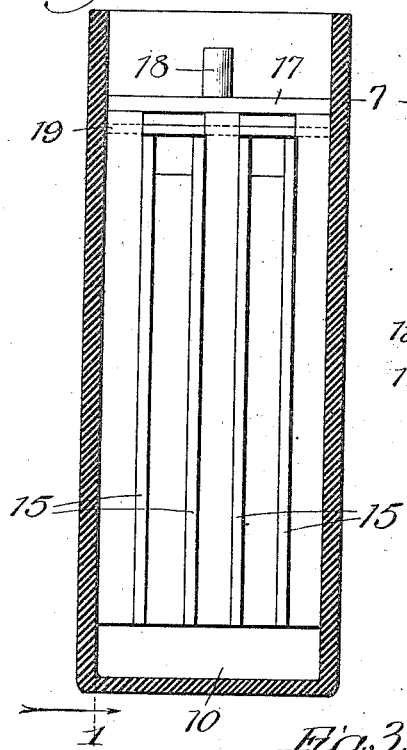
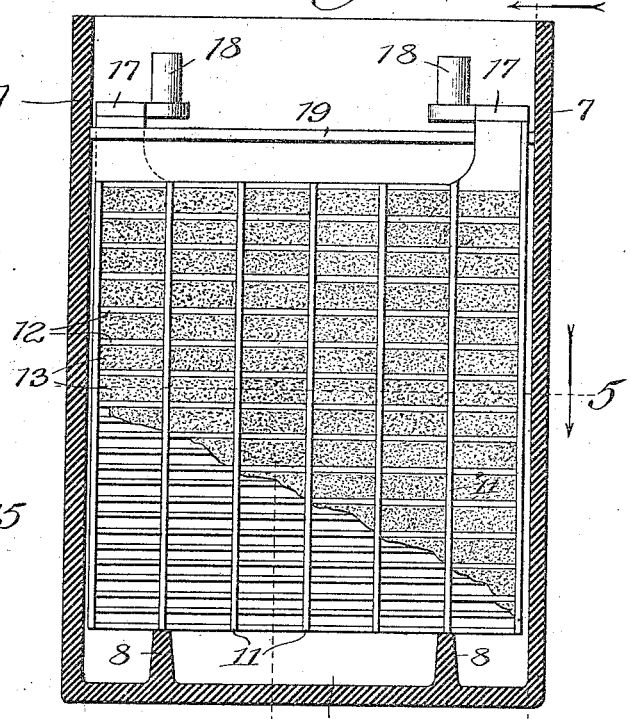
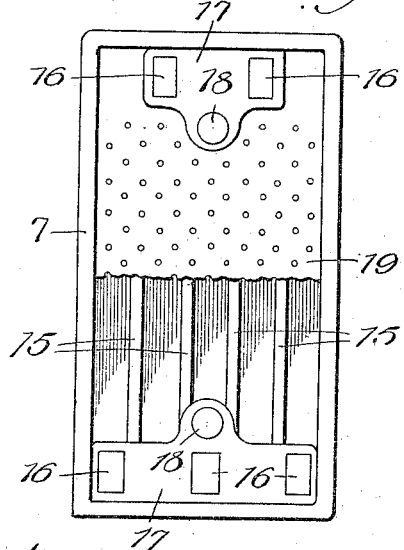
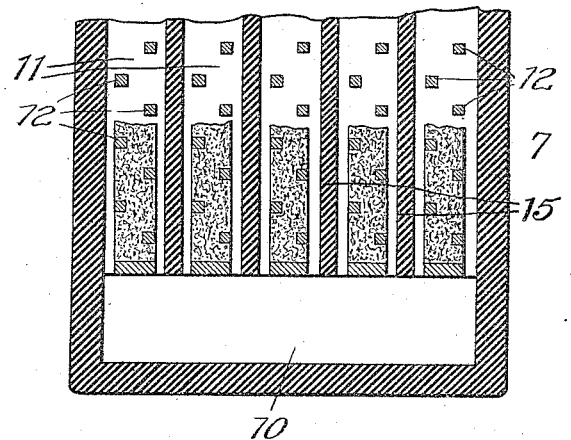

1,155,046.

Patented Sept. 28, 1915.
2 SHEETS—SHEET 2.

Witnesses:

Inventor:
Walter A. Crowdus,

UNITED STATES PATENT OFFICE.

WALTER A. CROWDUS, OF CHICAGO, ILLINOIS, ASSIGNOR OF ONE-HALF TO ATKINSON, MENTZER & COMPANY, OF CHICAGO, ILLINOIS, A CORPORATION OF ILLINOIS.

STORAGE BATTERY.

1,155,046.  Specification of Letters Patent.  Patented Sept. 28, 1915.

Application filed March 7, 1914. Serial No. 823,127.

*To all whom it may concern:*

Be it known that I, WALTER A. CROWDUS, a citizen of the United States, residing at Chicago, in the county of Cook and State of Illinois, have invented a new and useful Improvement in Storage Batteries, of which the following is a specification.

My invention relates to an improvement in the class of secondary or storage batteries, in which the active material, or material to be rendered active, is mechanically applied to the support-plate or "grid," which is more usually composed of lead or an alloy of lead and antimony.

Figure 5:
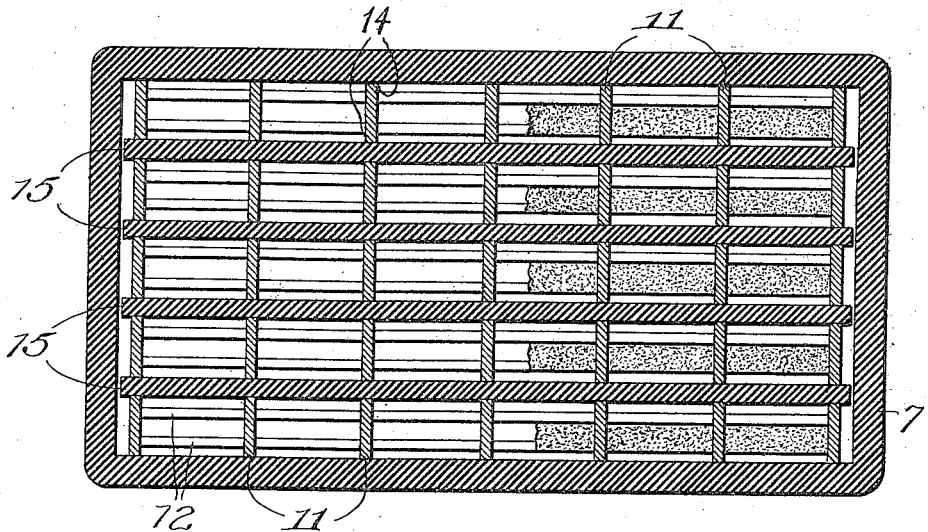
Figure 6:
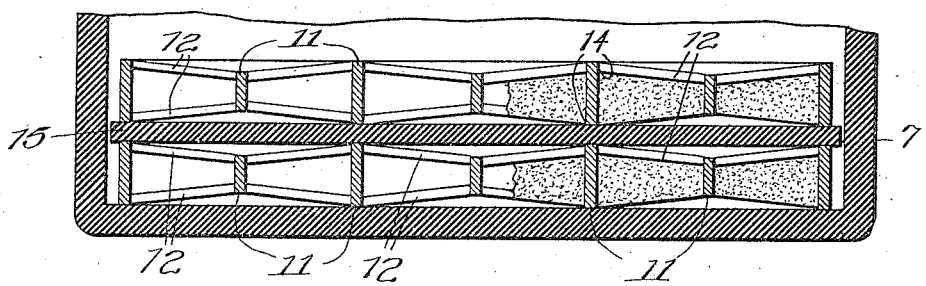

In the accompanying drawings, Figure 1 is a section on line 1, Fig. 2, of a storage-battery containing my improvements, showing a portion of the grid presented unfilled with active material; Fig. 2 is a section on line 2, Fig. 1; Fig. 3 is a top plan view of the battery; Fig. 4 is an enlarged section on line 4, Fig. 1; Fig. 5 is an enlarged section on line 5, Fig. 1, and Fig. 6 6 is a view like that presented in Fig. 5, but broken and showing a modification.

The jar 7, of any suitable size and material (more usually hard rubber) is shown to be provided with vertical internal seating ribs 8 on its bottom for the grids 9. These ribs in ordinary practice form a bottom-chamber 10 for lodgment below and out of contact with the grids of any active material that may drop from them, to thus avoid short-circuiting. Each grid comprises a frame containing vertical ribs 11 at intervals between its side members and connecting its top and bottom members, and these ribs are crossed, on both faces of the grid, by parallel ribs 12 spaced uniformly apart along each grid-face, those on the opposite faces being in staggered relation to each other, and this arrangement of ribs forms pockets for confining the active material, or material to be rendered active, 13; all of which describes a known construction of storage-battery element.

On the opposing faces of the grids I provide projections 14. These may be produced in the form most clearly shown in Fig. 5, by providing the side-members of the frame and the ribs 11 which are the same as the side-members of a width to project their opposite edges beyond the lines of horizontal ribs 12, or, as shown as a modified construction in Fig. 6, by providing the side frame-members and alternate ribs 11 of the aforesaid width, whereby the opposite members 12 are caused to converge to the edges of the relatively-narrower ribs 11, thus rendering the opposite grid-faces of somewhat undulatory form. It is within my invention to provide the required projections on the opposite grid-faces in any suitable manner, but it is important that they shall be so disposed, as on the edges of vertical ribs, as not to obstruct access of the liquid electrolyte, employed in the battery, to the surface of the material 13, held in the interstices or pockets formed by the ribs. Between each pair of grids (positive and negative), I interpose a thin, ribless diaphragm-like separator 15 which is confined between the projections and forms between each of its faces and the opposing face of a grid an ample extent of space for circulation of the electrolyte employed. The separator I prefer to use is composed of a thin wooden sheet chemically treated to remove its contained gums and acids and enhance its porosity; and this wooden sheet should be placed in position with its grain running horizontally, or crosswise of the ribs 11 to reduce liability of its confinement between the projections on the faces of opposing grids to split the sheet, as the tendency would be were the grain to run lengthwise of the projections.

Each grid is provided with a terminal-post 16, the posts in each of the two opposite series thereof being connected by a pillow-strap connector 17, as usual, having a binding-post 18. I prefer to cover the upper ends of the grids with a perforated sheet 19 (Fig. 3) of hard rubber, or the like, fitting snugly within the mouth of the jar, to prevent splashing of the liquid electrolyte, which may be of any suitable composition.

Providing the support-plates or grids 9 with projections on their faces enables the use of a ribless, flat-sided separator 15 and positioning it midway between the plates, thus affording ample and free space for the flow of the electrolyte and preventing lowering of the acid-density of the latter at the plate-surface of active material by the volume of the electrolyte between the grid and separator, it being a fact well-known in the art that the greater the bulk of the electrolyte in close proximity to the active material, the better it will maintain the acid strength within the pores of the active material, which is especially desirable for high discharge rates.

The advantages of my improvement are particularly marked with relation to a construction of storage-battery in use wherein the grid-faces are uniform or devoid of spacing projections, and the separator is a porous sheet of thin wood having parallel vertical ribs formed, as by grooving the sheet, on one surface. The separator of this construction necessitates, in its use, that one face of a support-plate or grid be in contact with the entire surface of the flat side of the separator which prevents the desired action of the electrolyte; the only spacing produced by this separator-sheet being that of its ribs on one surface forming grooves for the circulation of the electrolyte in proximity to the active material on the adjacent grid. On the other hand, in my case the separator-sheet not only affords the ample circulating space for the electrolyte at both of the faces, as aforesaid, but being ribless and thus relatively thin, it interposes the minimum of inert material between grids and decreases accordingly the electrical resistance in the cell.

What I claim as new and desire to secure by Letters Patent is—

1. In a storage-battery, a couple comprising positive and negative ribbed grids holding the active material, or material to be rendered active, said grids presenting projections on their opposite faces, and a one-piece thin wooden separator-forming diaphragm confined by the projections centrally between opposing grids and having the grain of the wood extending crosswise of said projections.

2. A storage-battery grid comprising a frame containing vertical ribs of successively relatively greater and lesser widths and cross-ribs on opposite sides of the frame converging from the opposite edge-portions of the wider ribs to those of the narrower ribs, said wider ribs forming spacing face-projections on the grid, for the purpose set forth.

WALTER A. CROWDUS.

In presence of—
A. C. FISCHER,
O. C. AVISUS.

Copies of this patent may be obtained for five cents each, by addressing the "Commissioner of Patents Washington, D. C."